Aug. 28, 1962 W. I. BOYCE-SMITH ET AL 3,051,523
COUNTERBALANCED TRUCK BED LID
Filed Sept. 20, 1961 2 Sheets-Sheet 1
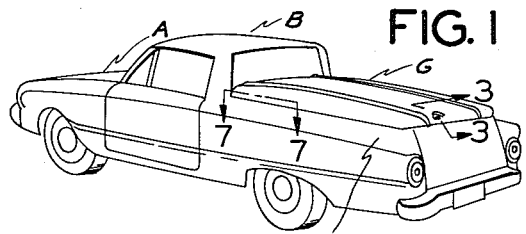
FIG. 1
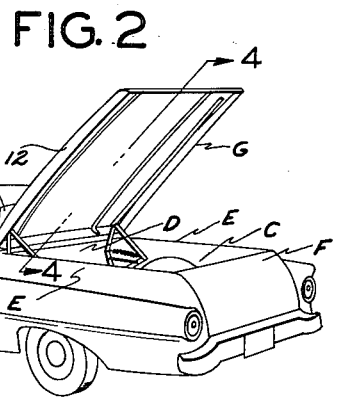
FIG. 2
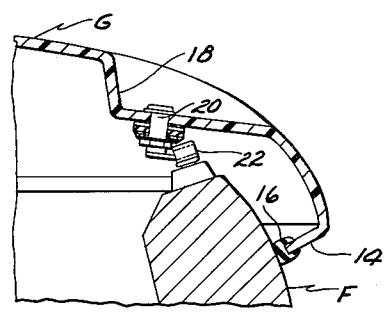
FIG. 3
FIG. 4
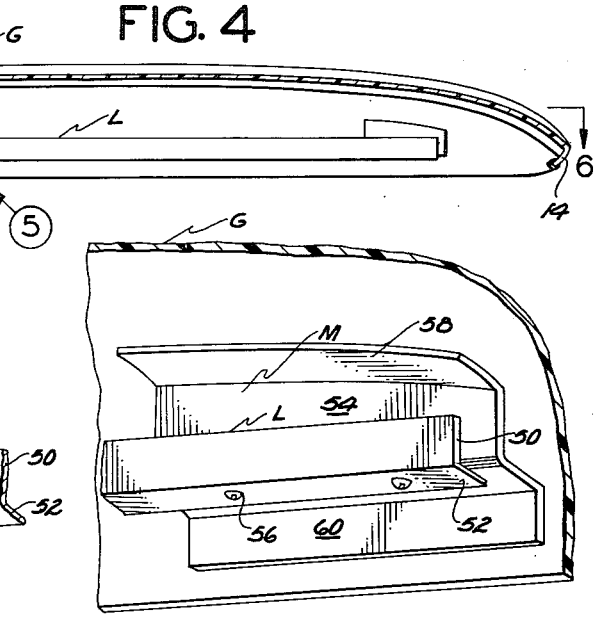
FIG. 5
INVENTORS
WILLIAM ILLSLEY BOYCE-SMITH
MERRILL RUSH POWELL
BY
William C. Babcock
ATTORNEY Aug. 28, 1962 W. I. BOYCE-SMITH ET AL 3,051,523
COUNTERBALANCED TRUCK BED LID
Filed Sept. 20, 1961 2 Sheets-Sheet 2
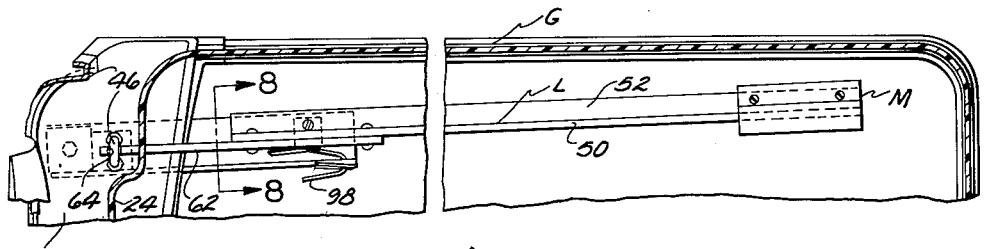
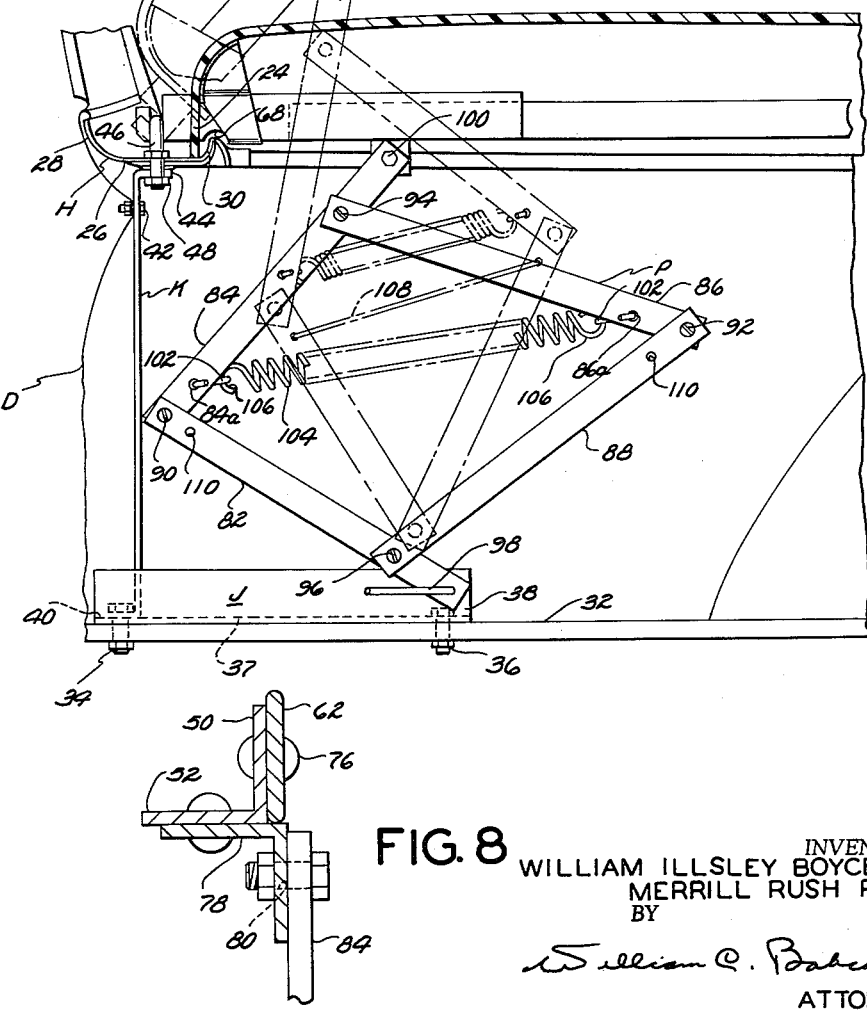
INVENTORS
WILLIAM ILLSLEY BOYCE-SMITH
MERRILL RUSH POWELL
BY
ATTORNEY

United States Patent Office 3,051,523
Patented Aug. 28, 1962

3,051,523
COUNTERBALANCED TRUCK BED LID
William I. Boyce-Smith, Burbank, and Merrill R. Powell, Van Nuys, Calif., assignors to Leslie A. Dawes, Long Beach, Calif.
Filed Sept. 20, 1961, Ser. No. 139,496
8 Claims. (Cl. 296—100)

The present invention relates generally to the field of automotive accessories, and more particularly to a counterbalanced lid adapted to be pivotally and removably mounted on an automotive pick-up type vehicle to cover the cargo area thereof.

During the past few years the automotive pick-up type vehicle has steadily increased in popularity. An example of this type of vehicle is the 1961 Ranchero model of the Fork truck manufactured by the Ford Motor Company, Dearborn, Michigan. While the modern automotive pick-up vehicle is ideally suited for commercial use, it is extremely attractive in appearance, and as a result may not only be used for commercial purposes, but for pleasure trips as well, such as camping, fishing and hunting trips, and the like. Although the automotive pick-up type vehicle has numerous advantages, two disadvantages thereof are that the truck bed or cargo-carrying area is open, whereby cargo or other articles carried therein may be stolen therefrom, and the cargo may be damaged by rain or moisture.

A major object of the present invention is to provide a counterbalanced lid that may be pivotally and removably mounted on an automotive pick-up type vehicle that will enhance rather than detract from the appearance of the vehicle when mounted thereon, and will also eliminate the disadvantages outlined above.

Another object of the invention is to provide a lid for an automotive pick-up type vehicle that may be locked when in a protective position to substantially eliminate the hazard of loss of cargo, tools and other valuables from the vehicle, and when the lid is in the closed position it maintains the cargo area of the vehicle in a dry condition to protect not only the cargo and other items carried therein from rain and moisture, but protects the bed portion from the deteriorating effects of the weather.

Yet another object of the invention is to provide a lid that can be installed on a vehicle in a relatively short time with normally available hand tools by those having limited mechanical ability.

A still further object of the invention is to supply a lid for automotive pick-up type vehicles that is preferably fabricated from resin-impregnated fiber glass, is of sturdy construction, can be subjected to sudden shock and hard usage without damage, requires a minimum of maintenance attention, and can be sold at a sufficiently low price as to encourage its widespread use.

These and other objects and advantages of the invention will become apparent from the following description thereof, and from the accompanying drawings illustrating the same in which:

FIGURE 1 is a perspective view of an automotive pick-up type vehicle with the lid of the present invention pivotally and removably mounted thereon in the closed and locked position;

FIGURE 2 is a perspective view of the vehicle shown in FIGURE 1 showing the lid after it has been pivoted upwardly to the open position;

FIGURE 3 is a fragmentary vertical cross-sectional view of a portion of the lid shown in FIGURE 1 taken on line 3—3 thereof;

FIGURE 4 is a longitudinal cross-sectional view of the lid taken on line 4—4 of FIGURE 2;

FIGURE 5 is an enlarged perspective view of one of the longitudinally extending support rails disposed on the interior of the lid and affixed thereto;

FIGURE 6 is a combined horizontal cross-sectional and top plan view of a side portion of the lid taken on line 6—6 of FIGURE 4;

FIGURE 7 is a combined vertical cross-sectional and side elevational view of the lid and vehicle on which it is mounted taken on line 7—7 of FIGURE 1; and FIGURE 8 is a fragmentary vertical cross-sectional view of a portion of the lid and vehicle on which it is mounted taken on line 8—8 of FIGURE 6.

With continued reference to the drawings, an automotive pick-up type vehicle A is shown in FIGURES 1 and 2 that has a cab B and truck bed C. The truck bed C is rectangular and defined by a forward wall D, as may best be seen in FIGURES 2 and 7, two side walls E, and a hinged tailgate F.

The lid G, which is the subject of the present invention is removably mountable on vehicle A, and may be disposed in either the open position shown in FIGURE 2 or the closed position shown in FIGURE 1. By means that will be explained in detail hereinafter, the lid G is counterbalanced when in any one of the positions between that shown in FIGURE 1 and the open position shown in FIGURE 2. Lid G is preferably formed from resin-impregnated fiber glass and includes a rectangular panel 10 that has a longitudinally extending surface that is slightly convex, as shown in FIGURE 4.

The longitudinal sides of panel 10 develop into curved, downwardly extending side portions 12 of such configuration as to blend with the upper portions of the side walls E of the truck bed. The rear of panel 10 develops into a downwardly and forwardly extending portion 14 that overlaps the upper part of the tailgate F when the tailgate is in the closed position shown in FIGURE 3. The rear end portion 14 of panel 10 is provided with weatherstripping 16 mounted on the forward extremity thereof, and this weatherstripping is in pressure sealing contact with the upper rear surface of the tailgate F when the lid G is in the closed position shown in FIGURES 1 and 2. The central rear section of panel 10 has a recess 18 formed therein.

A lock 20 of conventional design extends downwardly through the recess 18, and when rotated by a key or other actuating means (not shown) can be placed in engagement with the mating portion 22 of lock 20 that is mounted on and extends upwardly from the tailgate F as shown in FIGURE 3. Thus, when the lock 20 is in engagement with the lock portion 22, the cover G is held in a closed position relative to the truck bed C, and the possibility of unauthorized access thereto for the removal of cargo, tools or other valuables from the truck bed is avoided.

The forward end of panel 10 develops into a substantially straight, downwardly extending forward portion 24, as may best be seen in FIGURES 6 and 7. A rain gutter H is provided that extends transversely across the forward section of the truck bed C, located just below a window 26 formed in the cab B and disposed adjacent the forward wall D of the truck bed. The gutter H includes an elongate web 27, the forward edge of which develops into an upwardly and forwardly extending curved flange 28, and the rear edge of this web develops into an upwardly extending flange 30. The flange 28 is of substantially greater height than the flange 30. The web 26 preferably has an upper surface that slopes slightly towards the sides of the vehicle to assure that water, moisture or rain will drain therefrom.

Two laterally spaced rails J are affixed to the floor 32 of the truck bed C by bolts 34 and 36 respectively. Rails J are preferably formed from angle iron, and the bolts 34 and 36 pass downwardly through bores formed in one leg 37 thereof, with the other leg 38 of the angle iron extending upwardly as shown in FIGURE 7. Two uprights K are provided, the lower ends of which are bent or otherwise formed to define two extensions 40 in which bores are formed and through which the bolts 34 project to hold the uprights in fixed position relative to the forward wall D of bed C. Uprights K also have bores formed in the upper portion thereof through which bolts, screws or other fastening means 42 extend to engage the forward wall D, as best shown in FIGURE 7. The upper ends of the uprights K develop into two horizontal extensions 44 that are in abutting contact with the under surface of the web 26. The two extensions 44 have bores formed therein, as does the web 26. Eyebolts 46 extend downwardly through these bores, with the lower ends thereof being engaged by nuts 48.

Two laterally spaced, substantially parallel support members L are affixed to the interior surface of the lid G, as may best be seen in FIGURES 4 and 5. Support members L (FIGURE 5) are preferably fabricated from angle iron and include two legs 50 and 52 that are disposed normal relative to one another, with leg 50 being vertically positioned. Two side braces M are provided, located within the lid G on opposite sides of the rear portion thereof, as shown in FIGURE 5. Each side brace M includes a longitudinally extending portion 54 of transverse L-shaped cross section, with the exterior surface of the portion 54 being in abutting contact with the interior surface of legs 50 and 52. Screws 56 or other fastening means project upwardly through openings formed in the leg 52 to hold the supporting member L in a fixed position relative to the side brace M. The upper portion of the longitudinally extending brace portion 54 develops into a flange 58 that is bonded to the upper interior side surface of lid G by an epoxy cement or other suitable bonding means. The portion 54 also develops into a downwardly extending flange 60 that is likewise bonded to the interior surface of lid G by suitable means, such as the epoxy cement previously mentioned.

Each of the elongate members L extends forwardly to a hinge plate assembly N, as best seen in FIGURE 5. The hinge assembly N includes a rigid elongate strip 62 that projects forwardly through a slot 64 formed in the forward wall section 24 of lid G and extends therebeyond a substantial distance. That portion of strip 62 extending forwardly beyond the wall section 24 has a vertically extending slot 66 formed therein, which as may be seen in FIGURE 7, is adapted to removably engage the eye of one of the eyebolts 46.

The strip 62 just rearwardly of the wall 24 has an upwardly extending recess 68 formed therein which permits the lid to occupy the closed position shown in FIGURE 1, without the strip 62 contacting the upper extremity of flange 30. A bifurcated reinforcing member 70 extends upwardly and forwardly relative to each of the strips 62 and is affixed thereto by transversely positioned fastening means 72, as best shown in FIGURE 5. Member 70 terminates on the upper forward extremity thereof in two oppositely disposed flanges 74 that abut against the forward interior surface portion of lid G (FIGURES 4 and 5).

Each of the supporting members L, as shown in FIGURE 5, terminates at approximately the rear edge of the bifurcated member 70. Each of the strips 62 is affixed to the forward portion of one of the flanges 50 by a transversely extending screw, bolt or other fastening means 76. A lug 78 is provided for each member L and extends downwardly from the forward portion thereof as shown in the drawing. Each lug 78 has a transverse bore 80 formed therein.

Two identical counterbalancing units P are provided of the structure shown in FIGURE 7. Each unit P includes first, second, third and fourth links 82, 84, 86 and 88, respectively. Links 82 and 84 are pivotally connected at their adjoining end portions by suitable fastening means 90 such as pins, screws, or the like. Likewise, links 86 and 88 are connected at their adjoining ends by suitable fastening means 92. The link 86 is pivotally connected to line 84 at a position intermediate the ends thereof by suitable fastening means 94, which likewise may be screws, pins or the like. Link 88 is connected by pivotal fastening means 96 to the link 82 at a position intermediate the ends thereof.

The downwardly and rearwardly extending end of each link 82 is formed with a transverse bore that is horizontally alignable with a transverse bore formed in one of the legs 38 of one of the rails J. When the bores are so aligned, a U-shaped member 98 can be slidably extended therethrough to removably support one of the sets of links 82 to 88 inclusive thereon. The upper end portion of link 84 has a transverse bore extending therethrough which is horizontally alignable with the bore 80 formed in one of the lugs 78, and when these bores are so aligned they are pivotally and removably connected to one another by a bolt or rivet 100 that is extended therethrough. Links 84 and 86 have bores 84a and 86a formed therein that are engaged by identical S-shaped members 102.

A tensioned helical spring 104 is provided which has hook-shaped ends 106 that removably engage the S-members 102 to at all times tend to move the parallelogram defined by links 82 to 88 inclusive from the position shown in solid line in FIGURE 7 to that shown in phantom line. The physical characteristics of each of the springs 104 is so selected relative to the weight of the lid G, as well as the pivotal arrangement of the links 82 to 88 one relative to the other, that as lid G is raised from the closed position towards the open position shown in FIGURE 2, the force exerted by springs 104 on links 84 will be just sufficient to balance the weight of the lid at the particular position to which it has been pivoted. It will be apparent that as the lid G is moved upwardly, the maximum downward force exerted by the lid, due to the weight thereof, which the springs 104 must counterbalance is that exerted when the lid has just been separated from the tailgate F. As the lid pivots upwardly, the center of gravity thereof moves forwardly relative to the truck bed C, and the vertical component of the weight of the lid that must be supported by the counterbalancing units P lessens. This lessening of the weight is accompanied by a decrease in lengths of springs 104 to cause exertion of a lesser upward force on the lid by links 84. When the lid has been moved to the fully open position shown in FIGURE 2, it may be locked in this position by means of a U-shaped member 108 having parallel legs that may be caused to removably engage bores 110 formed in the links 82 and 84 (FIGURE 1). Member 108 prevents pivotal movement of links 82 to 88 relative to one another, and without such movement the lid G cannot move, but is accordingly held in a fixed upwardly extending position as shown in FIGURE 2.

The operation of the invention has been explained in detail hereinabove and need not be repeated.

When it is desired to remove the lid from a vehicle on which it is installed, the members 98 are simply disengaged from the bores through which they extend, which permits separation of the counterbalancing assembly and the lid from the truck by simply pivoting the lid to the upwardly extending position shown in phantom line in FIGURE 7 and causing the slots 66 to be disengaged from the eyebolts 46. When it is desired to install the lid on a vehicle, the above described operation is simply reversed.

On some vehicles it is unnecessary to provide the gutter H and is dispensed with. When the gutter H is eliminated, the uprights K are still utilized and the eyebolts 46 are mounted on the upper portions thereof.

As previously mentioned, the lid G is preferably fabricated from a resin-impregnated fiber glass material. If such a material is subjected to excessive and off-centered loading it can deform and warp. Accordingly, the lid could be so distorted as to not truly engage the truck bed C. To eliminate such distortion, in case one of the springs 104 should break for example, it has been found desirable to longitudinally reinforce the lid by providing the members L, as may best be seen in FIGURES 2, 4 and 5.

Although the present invention is fully capable of achieving the objects and providing the advantages hereinbefore mentioned, it is to be understood that it is merely illustrative of the presently preferred embodiment thereof and we do not mean to be limited to the details of construction herein shown and described, other than as defined in the amended claims.

We claim:

1. A counterbalanced lid structure capable of being removably mounted on an automotive pick-up type vehicle having a cab and truck bed, two side walls and a forward wall that extend upwardly from said bed, and a tailgate pivotally supported from the rear of said bed, which lid structure comprises: a rain gutter including an elongate web having first and second flanges extending upwardly from the sides thereof; means for holding said gutter at a fixed position adjacent said forward wall and parallel thereto; a rectangular lid having downwardly extending forward and rear end portions and side portions, said lid being of such dimensions as to cover said truck bed when said side portions are disposed adjacent the upper edges of said side walls and parallel thereto; engageable means disposed above said web; engaging means projecting forwardly from said forward end portion of said lid and capable of engaging said engageable means for pivotally supporting said lid on said vehicle; two parallel, laterally spaced support members affixed to the interior surface of said lid and extending longitudinally relative thereto; two longitudinally extending, laterally spaced, parallel, upwardly projecting ribs affixed to the bottom of said truck bed; two lugs projecting downwardly from said members in vertical alignment with said ribs; two sets of first, second, third and fourth links; a plurality of first means for pivotally connecting said links in each of said sets together in the form of a parallelogram; second means for pivotally connecting each of said first links to one of said ribs; third means for pivotally connecting each of said second links to one of said lugs; two tensioned helical springs that extend between said second and third links and at all times exert an upwardly directed force on said support members, with the magnitude of said upwardly directed force decreases as said lid is pivoted towards the fully open position, but which force is at all times just sufficient to balance said lid in the particular position to which it may have been pivoted; means for removably locking said links and said lid in a fixed open position relative to said truck bed; and means for locking said lid to said tailgate when said lid and tailgate are both in a closed position.

2. A counterbalanced lid structure as defined in claim 1 wherein said engaging means removably engages said engageable means and said second means removably connects said first links to said ribs to permit said lid structure to be removed from said vehicle or mounted thereon when desired.

3. A counterbalanced lid structure as defined in claim 1 wherein said engageable means are two eyebolts that project upwardly above said gutter and said engaging means comprise two rigid strips which project forwardly from said lid said strips having downwardly extending slots formed in the forward extremities thereof that can removably engage said eyebolts when said lid is disposed in a substantially open position.

4. A counterbalanced lid structure as defined in claim 1 wherein the rearwardmost end portions of each of said third and fourth links are pivotally connected by said first means, with said first means also pivotally connecting the forward end of said third link to said second link at a position intermediate the upper and lower end of said second link, with said first means pivotally connecting the forward end of said fourth link to a position intermediate the upper and lower end of said first link.

5. A lid structure as defined in claim 1 wherein said rear end portion of said lid extends downwardly over the upper exterior surface of said tailgate when said tailgate is in a closed position, and weatherstripping is provided that is mounted on the lower extremity of said rear end portion, with said weatherstripping being in pressure liquid-sealing contact with said exterior surface of said tailgate when said tailgate is closed and said lid is in the closed position.

6. A counterbalanced lid structure as defined in claim 4 wherein each of said springs has the forward ends thereof connected to the lower portion of one of said second links and the rear end of said springs is connected to the lower portion of one of said third links, with each of said springs at all times sloping downwardly and forwardly relative to said truck bed.

7. A counterbalanced lid structure capable of being removably mounted on an automotive pick-up type vehicle having a cab and truck bed, two side walls and a forward wall that extend upwardly from said bed, and a tailgate pivotally supported from the rear of said bed, which lid structure comprises: a rain gutter including an elongate web having first and second flanges extending upwardly from the sides thereof; means for holding said gutter at a fixed position adjacent said forward wall and parallel thereto; a rectangular lid having downwardly extending forward and rear end portions and side portions, said lid being of such dimensions as to cover said truck bed when said side portions are disposed adjacent the upper edges of said side walls and parallel thereto; engageable means disposed above said web; engaging means projecting forwardly from said forward end portion of said lid and capable of engaging said engageable means for pivotally supporting said lid on said vehicle; at least one longitudinally extending support member affixed to the interior of said lid; a rib affixed to said truck bed; a lug projecting downwardly from said member; first, second, third and fourth links; a plurality of first means for pivotally connecting said links together in the form of a parallelogram; second means for pivotally connecting said first link to said rib; third means for pivotally connecting said link to said lug; a tension helical spring extending between said second and third links to at all times exert an upwardly directed force on said support member, with the magnitude of said force decreasing as said lid is pivoted towards the fully open position, but which force is at all times just sufficient to balance said lid in the particular position to which it may have been pivoted; and means for locking said lid to said tailgate when said lid and tailgate are both in a closed position.

8. A counterbalanced lid structure capable of being removably mounted on an automotive pick-up type vehicle having a cab and truck bed, two side walls and a forward wall that extend upwardly from said bed, and a tailgate pivotally supported from the rear of said bed, which lid structure comprises: a rectangular lid having downwardly extending forward and rear end portions and side portions, said lid being of such dimensions as to cover said truck bed when said side portions are disposed adjacent the upper edges of said side walls and parallel thereto; engageable means supported at a fixed position above said bed and adjacent the rear of said cab; engaging means projecing forwardly from said forward end portion of said lid and capable of engaging said engageable means for pivotally supporting said lid on said vehicle; two parallel, laterally spaced support members affixed to the interior surface of said lid and extending longitudinally relative thereto; two longitudinally extending, laterally spaced, parallel, upwardly projecting ribs affixed to the bottom of said truck bed; two lugs projecting downwardly from said members in vertical alignment with said ribs; two sets of first, second, third and fourth links; a plurality of first means for pivotally connecting said links in each of said sets together in the form of a parallelogram; second means for pivotally connecting each of said first links to one of said ribs; third means for pivotally connecting each of said second links to one of said lugs; two tensioned helical springs that extend between said second and third links and at all times exert an upwardly directed force on said support members, with the magnitude of said upwardly directed force decreases as said lid is pivoted towards the fully open position, but which force is at all times just sufficient to balance said lid in the particular position to which it may have been pivoted; means for removably locking said links and said lid in a fixed open position relative to said truck bed; and means for locking said lid to said tailgate when said lid and tailgate are both in a closed position.

References Cited in the file of this patent
UNITED STATES PATENTS

| | | |
|---|---|---|
| 2,912,276 | Schwartz et al. | Nov. 10, 1959 |
| 2,989,340 | Penner | June 20, 1961 |